United States Patent [19]

Gustin

[11] 4,089,350
[45] May 16, 1978

[54] DEVICE FOR ADAPTING THE RATE OF FLOW OF AN AUTOMATIC DRINKING BOWL

[75] Inventor: Jean Pierre R. Gustin, Charleville Mezieres, France

[73] Assignee: Societe Anonyme dite: La Buvette, France

[21] Appl. No.: 754,902

[22] Filed: Dec. 27, 1976

[30] Foreign Application Priority Data

Jan. 9, 1976 France .................................. 76 00391

[51] Int. Cl.² .......................... F15D 1/02; A01K 7/00
[52] U.S. Cl. ................................ 138/45 A; 119/72.5
[58] Field of Search ................ 119/72, 74, 72.5, 75; 138/40, 45, 45 A, 46

[56] References Cited

U.S. PATENT DOCUMENTS

| 1,078,584 | 11/1913 | Jones | 138/46 |
| 1,617,614 | 2/1927 | York | 138/45 A X |
| 2,151,656 | 3/1939 | Folke | 138/45 |

Primary Examiner—Hugh R. Chamblee
Attorney, Agent, or Firm—Weingarten, Maxham & Schurgin

[57] ABSTRACT

The device adapts the rate of flow of an automatic drinking bowl as a function of the pressure prevailing in the installation to which it is connected, and is constituted by a cylindrical part threaded at its two ends and provided with two oblique internal channels having different diameters, each being located in a radial plane of the part and opening to the outside of said latter on the other hand at one of its ends and on the other hand in its median, non-threaded zone; the part is inserted between an upstream portion and a downstream portion of the supply pipe of the drinking bowl at a union, by being screwed in a threaded hole made in the male element of the union and from the bottom of which issues the downstream portion so that the communication between the two portions is established through one of said channels. The invention finds advantageous application in equipment used in stock raising.

4 Claims, 1 Drawing Figure

U.S. Patent  May 16, 1978  4,089,350
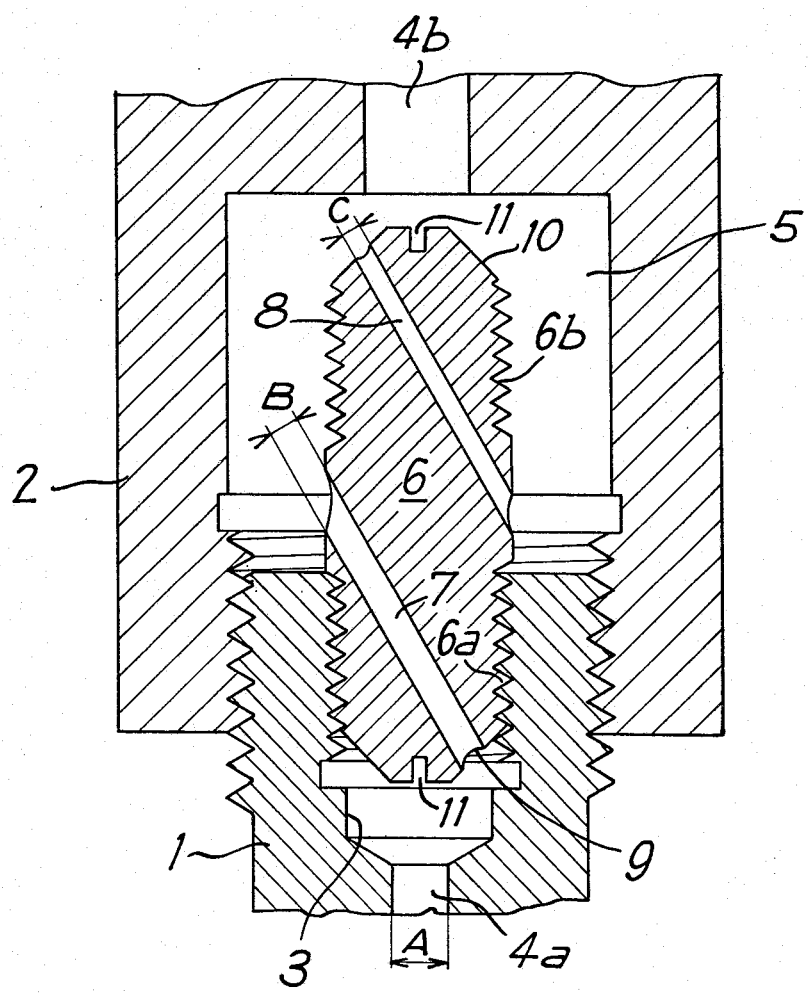

DEVICE FOR ADAPTING THE RATE OF FLOW OF AN AUTOMATIC DRINKING BOWL

The present invention relates to a device for adapting the rate of flow of an automatic drinking bowl, as a function of the pressure prevailing in the installation to which it is connected and also taking into account the type of animal for which it is intended.

The majority of automatic drinking bowls for animals which are presently on the market have a device for adjusting their rate of flow.

In fact, this device is necessary because the same type of drinking bowl may be connected to water supply installations whose operational pressures may differ as much as by three times. These known adjusting devices are generally constituted by an adjusting screw which acts, depending on its penetration, on the section of passage of the supply pipe of the drinking bowl.

The main drawback of this device resides in the fact that the adjustment is not stable. In fact, it has been observed that, due to the vibrations which exist in the pipes due in particular to the repeated hammerings and shocks to which they are subjected either due to the animals or, if the installations are outside ones, under the effect of the natural elements, said adjusting screws loosened. The rate of flow then becomes greater than that required by the animal and water is lost. Such devices require continuous surveillance of the watering installations and the farmer or stock-raiser is compelled to make frequent adjustments.

In order to remedy these drawbacks, the invention proposes to provide a device which enables a given drinking bowl to be adapted to the installation to which it is connected, this device then being trouble-proof and therefore not requiring any surveillance.

To this end, the device for adapting the rate of flow of an automatic drinking bowl according to the invention is constituted by a cylindrical part threaded at its two ends, provided with two oblique internal channels of different diameters, each being located in an axial plane of said part and opening outside the part, on the one hand, at one of its ends and, on the other hand, in its median, non-threaded zone; said part is introduced between an upstream portion and a downstream portion of the pipe supplying the drinking bowl at a union, by being screwed in a threaded hole made in the male element of the union and from the bottom of which said downstream portion, so that the communication between said parts is established through one of said channels.

In addition, said internal channels are of diameter smaller than the diameter of said downstream portion of the supply pipe of the drinking bowl.

Finally, the said part has a manoeuvring slot at each end.

The invention will be more readily understood on reading the following description with reference to the accompanying drawing, in which:

The single FIGURE shows a section through an embodiment of the device according to the invention.

Referring now to the drawing, the FIGURE schematically shows a union constituted by a male part 1 and a female part 2. The male part 1 is provided with a threaded opening 3 from the bottom of which issues the downstream portion 4a of a pipe, on which said union is fixed. The female part 2 determines with the male part 1, a chamber 5 into whose base opens the upstream portion 4b of the pipe. The portion 4a of the pipe is connected in known manner to an automatic drinking bowl and the portion 4b of this pipe is connected, also in known manner, to a water supply installation. Neither said installation nor said drinking bowl are shown in the drawing.

A cylindrical part 6 threaded at its two ends 6a and 6b is screwed in the said opening 3 by its end 6a. This part 6 comprises two internal channels 7 and 8, which are inclined and extend in an axial plane of the part, each of them opening to the outside of this part on the one hand in its median non-threaded zone and on the other hand at one of its ends. It will be noted that the ends of said part 6 are chamfered at 9 and 10 so that the channels 7 and 8 open outside the part at these chamfers.

In addition, it is to be noted that the diameters B of the pipe 7 and C of the pipe 8 are different and smaller than the diameter A of the portion 4a of the general pipe. Finally, the part 6 is provided, at each of its ends, with a manoeuvring slot 11 enabling it to be introduced, for example by means of a screwdriver, into the threaded hole 3. Other manoeuvring means may be envisaged, for example a non-threaded hexagonal part made on the median, non-threaded part of said part. The liquid coming from the water supply installation arrives in the chanber 5 through the portion of the pipe 4b and can reach the downstream portion 4a only through channel 7. As this latter has a diameter smaller than said diameter A, it constitutes a limiter to the flow of liquid admitted into the drinking bowl. If the part 6 is turned round and screwed by its end 6b in hole 3, the transfer of liquid from 4b to 4a will be ensured by the channel 8 whose diameter C is smaller than diameter B of channel 7, constituting an even more effective flow limiter.

In this way, if the drinking bowl is mounted on an installation in which a high pressure prevails, the part 6 may be so disposed that the channel 8 of smaller diameter ensures the passage of the fluid between the chamber 5 and portion 4a. If, on the other hand, the water pressure is relatively low, it is then sufficient to connect parts 1, 2 directly, by purely and simply eliminating the intermediate part 6. For an average water pressure, it will then be convenient to dispose the part 6 as shown.

The different diameters A, B and C also depend, of course, on the type of animal for which the drinking bowl is intended. The average rates of flow to be obtained are determined by the type of animal.

By screwing the part 6 in the housing 3 completely to the end of the threaded portion, this part is blocked and then becomes trouble-proof and fulfils its function without requiring surveillance.

This part is placed in position once and for all, when the drinking bowl is installed, and this operation may easily be explained by means of simple diagrams understandable to the farmer or stock-raiser using the drinking bowl.

The invention finds advantageous application in the domain of manufacturing farming and stock-raising equipment.

What is claimed is:

1. A device for adapting the rate of flow of an automatic drinking bowl as a function of the pressure prevailing in the supply pipe of the installation to which it is connected, said device comprising:
   a union member being connected in said supply pipe, said member having an upstream connection and a downstream connection to said supply pipe, said member being formed with an internal chamber communicating with said upstream connection and communicating with said downstream connection through a threaded opening: and a cylindrical part threaded at its two ends, said threaded ends being separated by a median non-threaded zone, said part being formed with two internal diagonal channels of different diameters, one end of the first channel opening at one end of said part, the other end of said first channel opening at said median zone, one end of the second channel opening at the other end of said part, the other end of said second channel opening at said median zone, said part being selectively reversibly threaded in said threaded opening in said union member, said median zone constituting an abutment for the engagement of the mating threads of said part and said opening;

whereby communication between said upstream and downstream connections is established through that one of said channels opening at the end of said part engaged with said threaded opening.

2. A device as claimed in claim 1, wherein the internal channels are of diameter smaller than the diameter of said downstream part of the supply pipe of the drinking bowl.

3. A device as claimed in claim 2, wherein said part has a manoeuvring slot at each of its ends.

4. A device as claimed in claim 1, wherein the said part has a manoeuvring slot at each of its ends.

* * * * *